(12) United States Patent
Paakkunainen et al.

(10) Patent No.: US 6,622,761 B1
(45) Date of Patent: Sep. 23, 2003

(54) DELIMBING APPARATUS

(75) Inventors: Marko Paakkunainen, Tampere (FI); Mauri Marttila, Valkkinen (FI)

(73) Assignee: Plustech Oy, Tampere (FI)

( * ) Notice: Subject to any disclaimer, the term of this patent is extended or adjusted under 35 U.S.C. 154(b) by 0 days.

(21) Appl. No.: 09/890,753

(22) PCT Filed: Dec. 7, 2000

(86) PCT No.: PCT/FI00/01075
§ 371 (c)(1),
(2), (4) Date: Aug. 3, 2001

(87) PCT Pub. No.: WO01/45491
PCT Pub. Date: Jun. 28, 2001

(30) Foreign Application Priority Data

Dec. 21, 1999 (FI) .............................................. 19992741

(51) Int. Cl.⁷ ............................................. A01G 23/095
(52) U.S. Cl. ...................... 144/24.13; 144/4.1; 144/338; 144/343
(58) Field of Search ............................... 144/4.1, 24.13, 144/335, 338, 343

(56) References Cited

U.S. PATENT DOCUMENTS 5,908,060 A 6/1999 Fargeot

FOREIGN PATENT DOCUMENTS

SE 457436 12/1988

*Primary Examiner*—W. Donald Bray
(74) *Attorney, Agent, or Firm*—Quarles & Brady LLP

(57) ABSTRACT

The invention relates to a delimbing apparatus for processing elongated pieces, particular tree trunks (S), which apparatus (1) comprises a frame structure (2) to be suspended at the end of a boom assembly in a working machine, at least one means, articulated in relation to said frame structure, for processing the trunk (S), and actuators (31a, 31c, 51a, 51b) for controlling the position and force effect (F) of said means. In the invention, said actuators comprise at least one joint (100) driven by a pressurized medium and comprising a joint frame (101), a joint arm (103) swivelled in said joint frame, and a blade structure (105, 106) fitted in said joint, by means of which blade structure the pressure effect of the pressurized medium produces said swivelling.

10 Claims, 4 Drawing Sheets

DELIMBING APPARATUS

Figure 1:
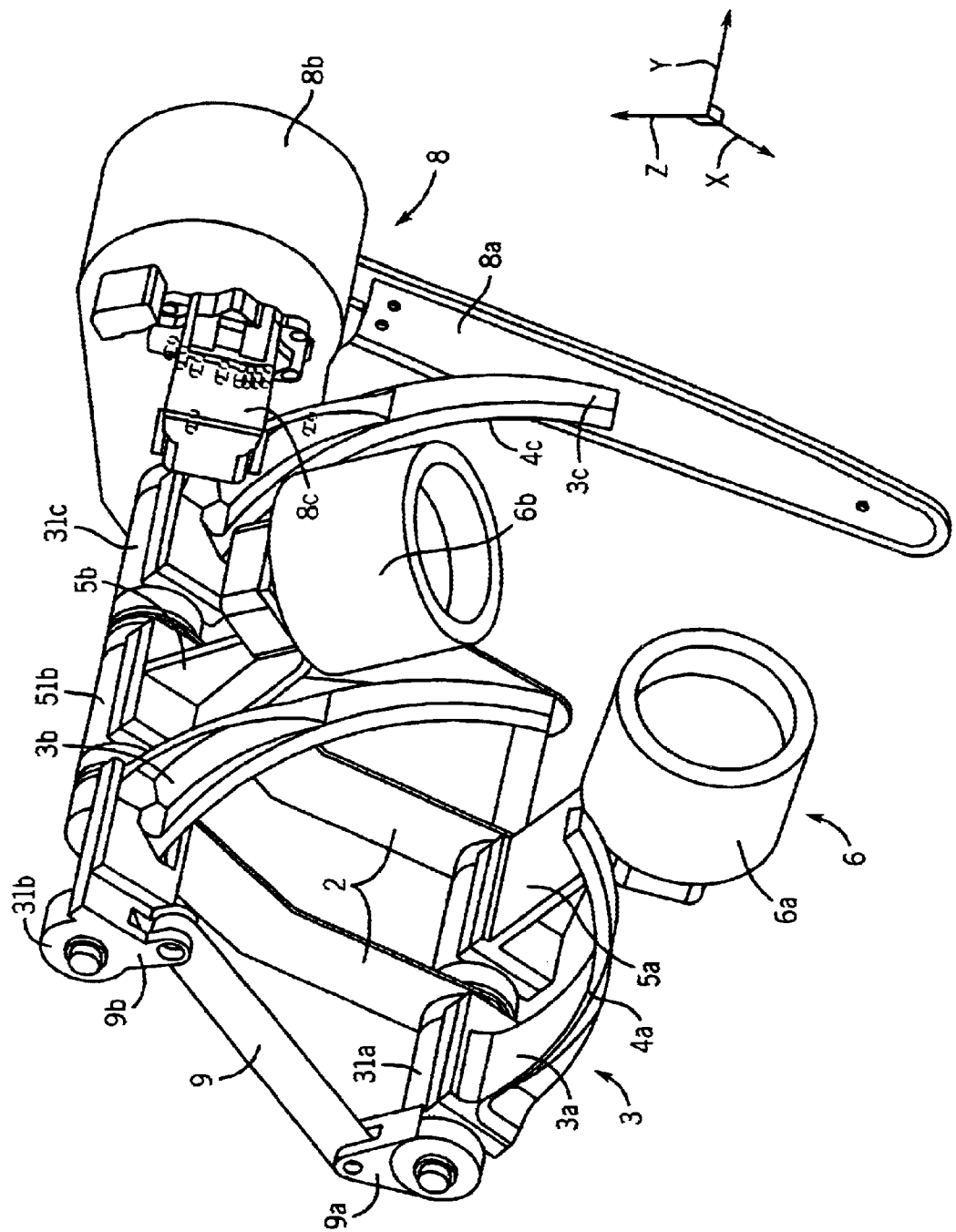

The invention relates to a delimbing apparatus for processing elongated pieces, particularly tree trunks, according to the preamble of claim 1.

For the processing of tree trunks, a harvester head is used for the purpose of gripping an upright growing tree, to cut the tree and to fell it for processing the trunk, typically for delimbing and cutting it into pieces of fixed length. The head is normally fixed at the end of a boom assembly in a working machine, such as a harvester, which is movable on a terrain by means of wheels or a crawler. Some harvester heads are also used for manipulating the trunk during loading. The harvester head is connected to the boom assembly in an articulated manner, and it comprises the necessary actuator means, normally hydraulic cylinders and hydraulic motors, by means of which the position of the head and its different functions can be controlled. The head, which, in the following description, will also be referred to as the delimbing apparatus, also comprises means which can be swivelled in relation to a frame structure. These means include e.g. delimbing means, normally pairwise on different sides of the trunk, which comprise delimbing blades for delimbing branches while the trunk is supported and transferred through the apparatus in the longitudinal direction of the trunk. Feeding means, normally pairwise on different sides of the trunk, normally comprise a feed pulley or a feed roll which is driven by a hydraulic motor, is pressed against the trunk, and pulls it by means of friction past the delimbing blades and through the apparatus. The head also accommodates cutting means, such as a chain saw, by which the trunk is cut to a desired length by stopping the trunk and activating the sawing.

Publication U.S. Pat. No. 5,219,010 discloses a known delimbing apparatus which comprises two pairs of delimbing means and one pair of feeding means. The delimbing means and the feeding means are articulated around a substantially horizontal and vertical direction in relation to the frame structure, respectively. It is also known to couple the feeding means to the frame structure in such a way that they are articulated around a substantially horizontal axis. The delimbing blade is articulated in relation to the frame structure by means of a joint. In addition to this, the joint is affected by actuators, most typically a separate cylinder which is driven by a pressurized medium and produces a stroke, producing the necessary moment force to maintain the position and force effect of the delimbing blade. Furthermore, the pair of the means is often coupled to each other by said cylinder, but the cylinder can also be connected at its other end to the frame structure. A necessary pressurized medium circuit is used to control the pressurized medium to be supplied to the actuator means.

In a conventional hydraulic cylinder, the pressure of the pressurized medium is effective on the circular piston surface which can be increased to increase the stroke force of the cylinder and thereby also the moment to be produced with the cylinder. However, this will increase the dimensions and weight of the cylinder, wherein the placement of cylinders which are large in size and have particularly long strokes becomes problematic. Cylinders protruding from the apparatus are easily collided with obstacles and damaged. At the same time, hoses and tubes for the pressurized medium in the cylinder are easily stuck and broken. The stroke of the cylinder causes a moment in the joint; however, the moment is not constant during the whole stroke, but the force effect of the means is variable. This makes it more difficult to control particularly the pressure levels of the pressurized medium circuit.

It is an aim of the present invention to eliminate the drawbacks presented above. To achieve these aims, the delimbing apparatus according to the invention is primarily characterized in what will be presented in the characterizing part of the appended claim 1.

The central principle of the invention is to use an integrated joint which has a blade structure and is driven by a pressurized medium, for the control of the means. The surface area of the blade structure of the joint can be made larger than the surface area of the piston in the cylinder, and compared with a conventional piston, the blade structure is transverse, making a small joint possible. A particular advantage is achieved in that the moment force of the joint can be increased without increasing the pressure level and the external dimensions, because by doubling the number of the blade structures, it is also possible to double the moment force. On the other hand, the moment can also be easily increased by increasing the length of the structure in the direction of the axis of rotation of the joint.

Another advantage is that a constant torque is achieved with the joint in different rotational positions, wherein the torque is not affected by, for example, variations in the geometry of the cylinder and the connecting points of a prior art joint. Another result is that the control and optimization of pressure levels of the control circuit become easier. The joint is particularly advantageous in view of bearings, because in a joint driven by a pressurized medium, the compartments of pressurized medium can be arranged symmetrically, wherein the forces effective on different sides of the joint arm compensate for and counterbalance each other. The cylinder actuators always load the bearings unevenly.

By means of the invention, the actuators and the joint structures can be combined to make a very compact and protected structure possible. Cylinder structures can be eliminated, wherein the delimbing apparatus is also suitable for limited spaces, and breakages can be avoided. Moreover, the necessary tubes and hoses can be placed more easily to be protected by the structure. In addition to this, it is possible to use integrated structures in channellings for the pressurized medium, wherein the pressurized medium is led into a joint driven by the pressurized medium, for example, via drillings in the joint arm. Particular advantages are achieved, because the control circuit to be used for the control, including its valves, can also be integrated in the joint. If necessary, the number of joints driven by the pressurized medium can be reduced by arranging a mechanical link for the transmission of the rotational movement between the pair of the means.

Figure 2:
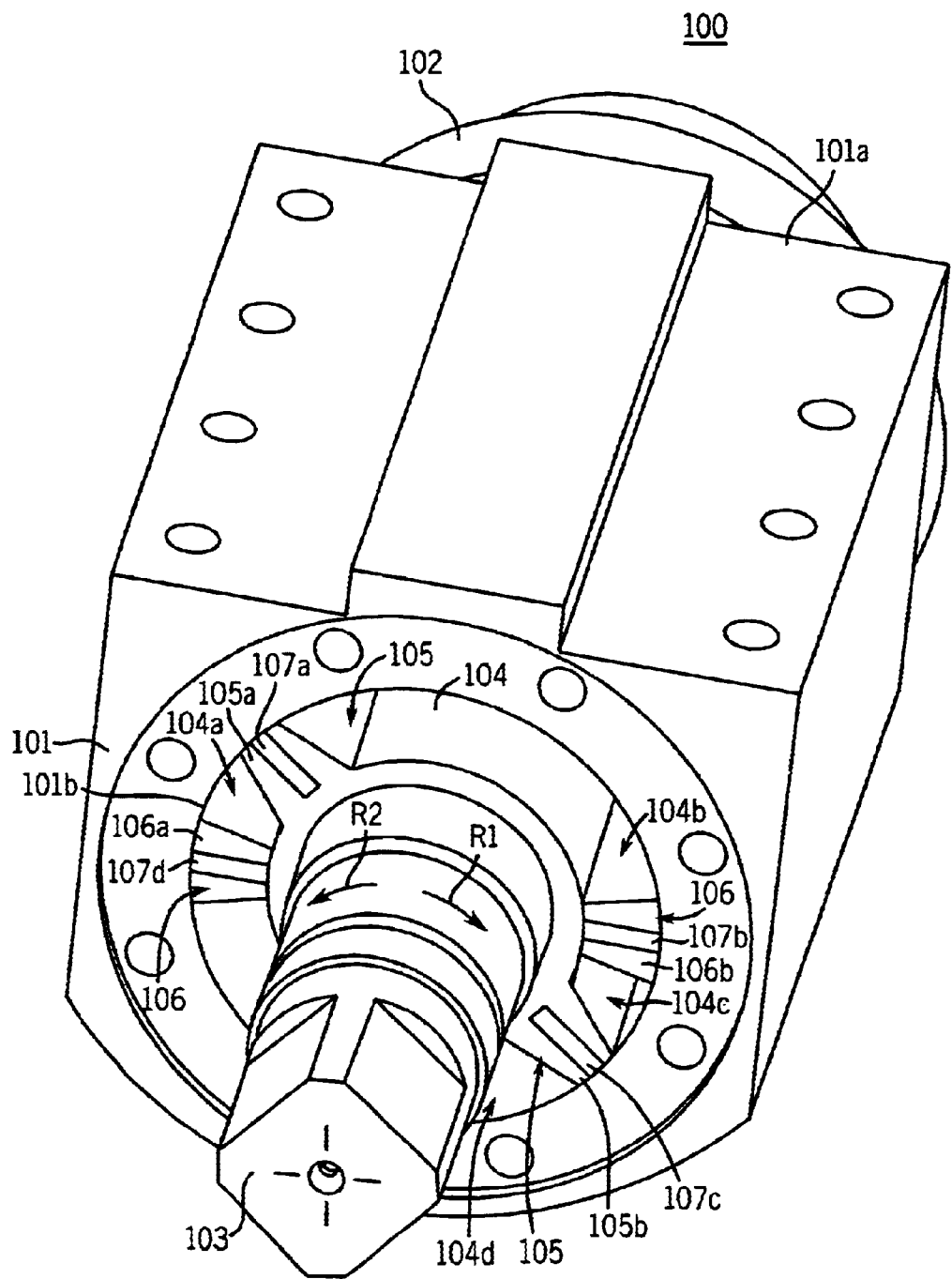
Figure 3:
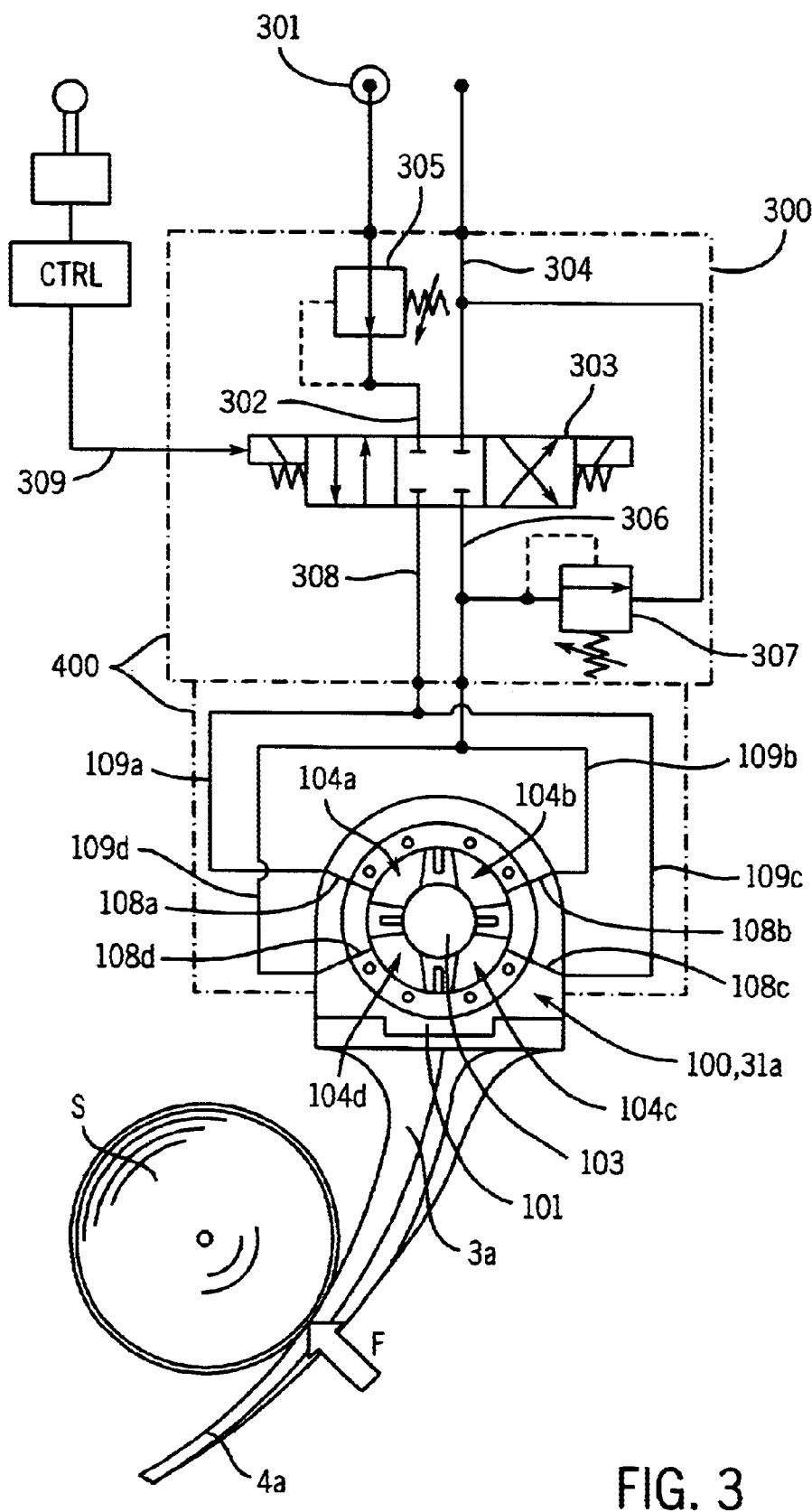
Figure 4:
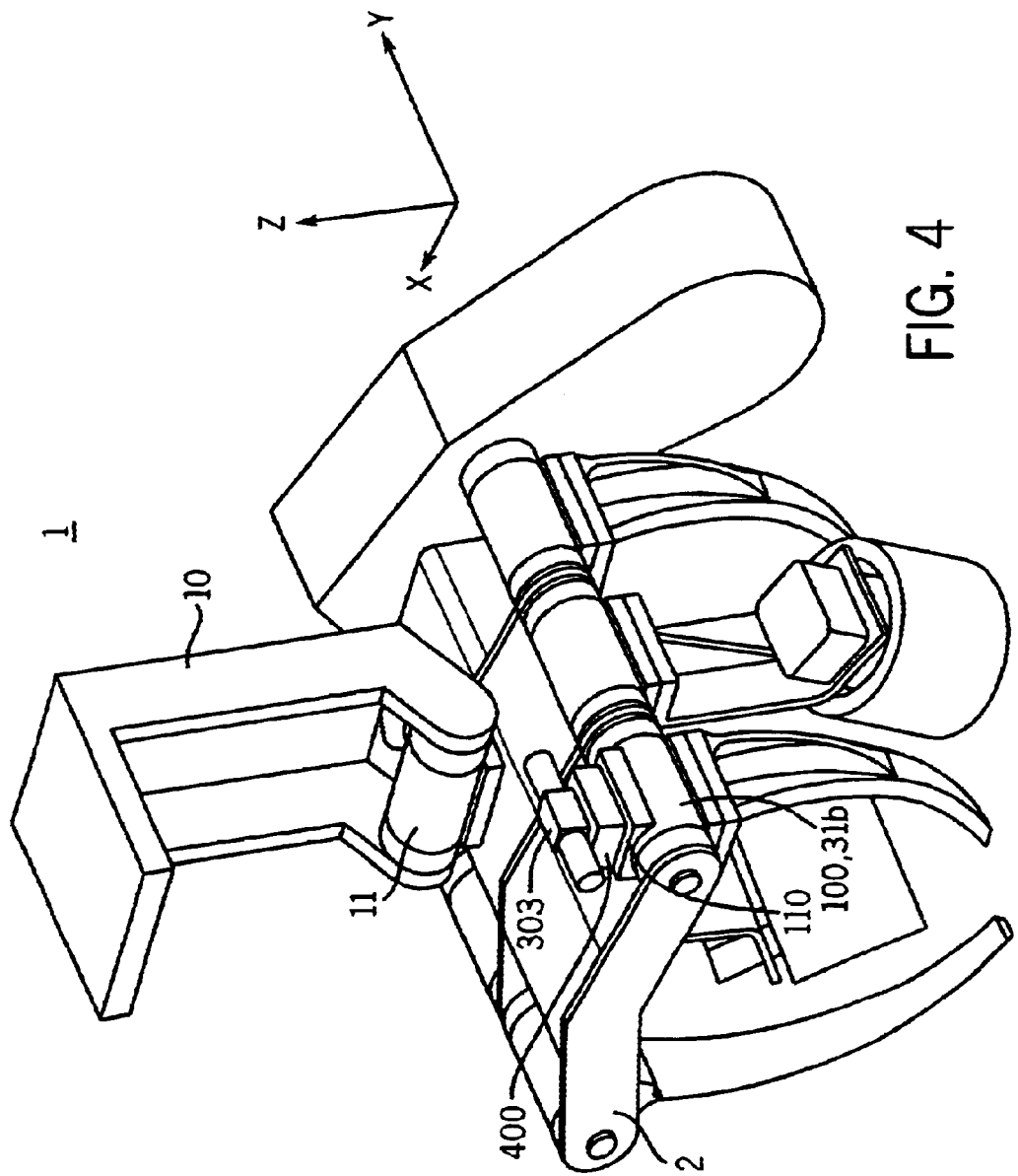

In the following description, the invention will be illustrated with reference to the appended drawings, in which FIG. 1 shows a delimbing apparatus according to a first embodiment of the invention in an inclined perspective view seen from below, FIG. 2 shows, in a perspective view, a joint driven by a pressurized medium in the delimbing apparatus of FIG. 1, when opened, FIG. 3 shows, in a principle chart, a pressurized medium circuit used for controlling the joint of FIG. 2, and FIG. 4 shows a delimbing apparatus according to a second embodiment of the invention in an inclined perspective view seen from above.

With reference to FIG. 1, a delimbing apparatus 1 according to the invention comprises a frame structure or a frame 2. For coupling the apparatus 1 to the end of a boom assembly of a working machine known per se, such as a harvester, the apparatus 1 comprises joint means (not shown in the figure) for suspension of the frame 2, typically with a means shown in FIG. 4, a tilt arm 10, and for swivelling said frame 2 around a substantially vertical (direction Z) axis of rotation. With reference to FIG. 4, the tilt arm 10 is connected in a rotatable manner to the frame 2 by means of a joint 11 driven by a pressurized medium. The joint 11 is arranged for swivelling the frame 2, supported by the tilt arm 10, around a substantially horizontal and transverse (direction X) axis of rotation between the vertical position and the horizontal position of FIG. 1.

The apparatus 1 also comprises a curved first delimbing means 3a and a curved second delimbing means 3b, which are connected in a rotatable manner to the frame 2 by joints 31a and 31b driven by a pressurized medium. The operation of the joints driven by the pressurized medium will be described below. In the position of FIG. 1, the delimbing means 3a and 3b are swivelled around substantially horizontal and longitudinal (direction Y) axes. The delimbing means 3a and 3b are provided with cutting edges or delimbing blades 4a and 4b for delimbing a trunk. The feeding means 6, such as feed rolls, or feed wheels 6a and 6b as shown in FIG. 1, are placed on opposite sides of the trunk to be delimbed, against its surface, and by means of their driving force effective on the trunk, they feed the trunk past the delimbing blades 4a and 4b to cut off the branches from the trunk. The feed wheels 6a and 6b are connected to the frame 2 by means of support arms 5a and 5b as well as joints 51a and 51b driven by pressurized medium, wherein the feed wheels 6a and 6b are rotated around the axis Y in FIG. 1.

The apparatus 1 also comprises cutting means 8 for cutting an upright growing tree trunk. The cutting means 8, preferably a chain saw 8a driven by a cylinder, are also used to cut the trunk into pieces of a fixed length when it is supported by the delimbing means 3. The chain saw 8a is shielded in a saw box 8b which also accommodates a saw motor 8c. To support the trunk, the delimbing means 3a and 3b enclose the trunk at least partly on its different sides, while the trunk is supported against the frame 2. The frame 2 can comprise a support roll or a planar surface, along which the trunk glides. The delimbing means 3a and 3b with their delimbing blades 4a and 4b are designed to be curved to conform to the shape of the trunk and to cut off branches from both of the side surfaces and the lower surface of the trunk. The apparatus 1 also comprises a delimbing blade 4c which is fitted in the delimbing means 3c and which rotates around the direction Y by means of the joint 31c driven by pressurized medium. To delimb the upper surface of the trunk, it is also possible to provide the front part of the frame structure 2 with an auxiliary delimbing blade which is pressed against the trunk by means of spring transmission or an actuator, such as a cylinder. At the same time, the delimbing means 3c keeps the trunk in its place during the sawing. The means 3a and 3b of the delimbing means 3 are placed before the feeding means 6 in the longitudinal direction of the trunk, and the means 3c is further behind. The pair for the means 3c can be another delimbing means, and the means 3c can also be totally eliminated.

During the delimbing, the trunk is transferred substantially horizontally in its longitudinal direction, i.e. the direction Y. Simultaneously, the delimbing means 3a and 3b are used to press the trunk towards the frame 2. The weight of the trunk tends to open the means 3a and 3b, wherein the actuators, according to the invention the joint 31a driven by pressurized medium, as well as a link 9 and the joint 31b, are used to maintain a torque which keeps the means 3a and 3b in a desired position to compensate for the force effects of the delimbing. By simultaneously supplying pressurized medium to the joint 31a, it is possible to change the position of the means 3a and thereby the position of the trunk. The torque force is used to produce the required force both to support the weight of the trunk and to press the trunk against the frame 2, if necessary. In a corresponding manner, the torque force is maintained in joints 51a and 51b to press the rolls 6a and 6b with a desired force against the trunk. The link 9, preferably a bar which transmits tensile and compression stress, is coupled to a cam 9a which rotates with the joint 31a and to a cam 9b which rotates with the joint 31b. The link 9 and the cams 9a, 9b are arranged in such a way that when the means 3a is closed, also the means 3b will close, and vice versa, wherein the joints 31a and 31b rotate in opposite directions. The link 9 can also be provided with a spring means (not shown in the figure) to attenuate impacts and forces effective on the means. It is obvious that the joint 31b can also be replaced with a joint driven by pressurized medium, such as the joint 31a, wherein the link 9 can be eliminated. The delimbing apparatus 1 can also be equipped with grapple means for loading and transferring trunks. The grapple means normally comprise a pair of jaws fitted on opposite sides of the trunk, operating in the same way as the delimbing means 3a, 3b to support the trunks.

FIG. 2 shows a joint 100 driven by pressurized medium according to a preferred embodiment, which joint comprises a joint frame 101 equipped with a mounting surface 101a for connecting the means, wherein the joint 100 can be used as the joint 31a, 31c, 51a or 51b in FIG. 1. The connection is made for example by means of a screw fastening. The joint frame 101 comprises a tubular frame cylinder 101b, which is closed at both ends by means of annular end pieces 102, of which one is detached to expose a joint arm 103 and a blade structure. The end pieces are connected for example by means of a screw fastening. The joint 100 comprises a joint arm 103 parallel to the frame cylinder 101b, extending through the end pieces in a sealed manner.

Bearings can also be provided between the end pieces and the joint arm 103. The shaft-like joint arm 103 is swivelled in the joint frame 101b around its longitudinal axis which is placed centrally in the frame cylinder 101b and which corresponds to direction Y in FIG. 1. An annular space is formed between the joint arm 103 and the joint frame 101, divided by the blade structures into four pressurized medium compartments 104a, 104b, 104c and 104d. The first blade structure 105 comprises two blades 105a and 105b, which are symmetrically connected to the joint arm 103 and are fitted in a sealed manner against the inner surface of the frame cylinder 101b and the end pieces 102. The second blade structure 106 comprises two blades 106a and 106b, which are fastened to the inner surface of the frame cylinder 101b and are fitted in a sealed manner against the outer surface of the joint arm 103. The blades 105a and 105b and the blades 106a and 106b, respectively, are symmetrically fitted in the space 104, wherein the pressurized medium compartments are also placed symmetrically. The blades 105b and 106b can also be totally eliminated, wherein it is possible to increase the angle of rotation of the joint arm 103.

The operation of the joint 100 is arranged in such a way that when a pressurized medium for example hydraulic oil, is supplied under pressure into the compartment 104a and 104c, its pressure effect makes the joint arm 103 rotate clockwise (arrow R1). In the embodiment of FIG. 1, the joint arm 103 is connected to the frame 2 in an unrotatable manner, wherein the joint frame 101 is allowed to swivel. The pressure effect makes the joint frame 101 rotate counterclockwise (arrow R2) around the joint arm 103. Simultaneously, pressurized medium is discharged from the compartments 104b and 104d. By closing the channels used for leading pressurized medium, the joint frame 101 is locked in its position. The pressure effect on the blades 106a and 106b maintained by the pressurized medium causes a torque turning the joint frame 101, which is further transferred to the connected means. Alternatively, upon leading pressurized medium into the compartments 104b and 104d and simultaneously out from the compartments 104a and 104c, the pressure effect causes rotation of the joint frame 103 clockwise (arrow R1). The blades placed against each other stop the rotational movement mechanically. The openings of the channels are placed in such a way that the supply of the medium into the compartment is possible in all rotational positions. Normally, the openings are placed in connection with or close to the blades 106a and 106b connected to the joint frame 101. The method of connecting the blades may vary.

Further, with reference to FIG. 2, the blades consist of two longitudinal blade parts parallel to the direction Y and the joint arm 103. The blades divide the annular space 104 into parts in the direction of the circumference. Between the blade parts, necessary sealings 107a, 107b, 107c and 107d, normally made of plastic or rubber material, are placed to separate the compartments from each other in a compact manner and to enable sealed gliding of the blade along the inner surface of the frame cylinder 101b. The fastening of the joint arm 103 to the frame 2 in a fixed manner can be arranged in a desired way. In view of the bearing forces, the fastening is preferably made at both ends of the joint arm 103. If necessary, the joint arm 103 may only extend through the second end piece 102.

FIG. 3 shows an advantageous embodiment of a control circuit 300 for the joint 100 driven by a pressurized medium, to control the position and force effect of the means. For illustrative purposes, the joint 100 is shown opened. The circuit 300 is used to control the pressurized medium supplied to the joint 100. Pressurized medium is supplied from a pressure source 301, such as a pump, along a pressure line 302 to the circuit 300. The circuit 300 comprises directional valve means 303, such as a proportional valve, to guide the pressurized medium to one or more desired pressurized medium compartments 104a–104d as well as to guide the returning pressurized medium to a return line 304. The circuit 300 also comprises pressure valve means 305, 306 to control the pressure of the medium. The joint 100 also comprises channels 108a, 108b, 108c and 108d for guiding the pressurized medium separately from or into each pressurized medium compartment, depending on the position of the valve 303. The pressure valve means comprise pressure control means 305 coupled to the pressure line 302 and pressure limiting means 307 coupled to the control line 306. The joint 100 is connected to the control lines 306 and 308.

The means shown in FIG. 3 is a delimbing means 3a supporting a trunk S, comprising a delimbing blade 4a, and the joint 100 is thus the joint 31a. The pressurized medium is led to the channels through pipes or hoses 109a, 109b, 109c and 109d. The pressure effect is used to maintain the torque of the joint 100 and thereby also the force F supporting the trunk S. To swivel the joint frame 101 around the joint arm 103, pressurized medium is supplied into two opposite compartments and discharged from the opposite compartments therebetween. To swivel the joint frame 101 in the opposite direction, the functions of the compartments are changed, controlled by the directional valve 303. The valve 303 is controlled by means of control signals 309, which can be current and/or voltage signals given by the control system CTRL of the working machine. The user gives the system CTRL a command to perform a desired function, or controls the function for example by means of a control lever. If necessary, the control system controls the circuit 300 by means of a control program and a control algorithm stored in memory means.

FIG. 4 shows a delimbing apparatus 1 according to a preferred embodiment of the invention, in which the joint 31b is a joint 100 driven by a pressurized medium. Furthermore, the control circuit 300 according to FIG. 3 is integrated in the joint 31b. The control circuit 300 is formed in a valve block 400, the means 305 and 307 shown in FIG. 3 being placed in drillings formed in the valve block 400. The joint frame 101 can also be used as the valve block. Furthermore, connecting lines 302, 304, 306 and 308 are formed by drillings. The valve 303 is fastened onto the surface of the block 400. The lines 109a–109d shown in FIG. 3 are also formed by drillings partly in the block 400, wherein they are directly connected to channels 108a–108d formed in the joint frame 101. Said lines and channels are fitted with each other by means of a mounting surface 110 between the joint frame 101 and the block 400. The pressure and return lines 302, 304 can also be led via the joint frame 101, wherein the necessary tubes and hoses can be connected either to the block 400 or to the joint frame 101. By means of the arrangement, it is also possible to reduce the number of pipes and hoses as well as connections, which are subjected to damage, and to place them in a more protected manner. To couple the joint 100 in operation, the pressure line of the working machine is coupled to the pressure line 302, the tank line of the working machine is coupled to the return line 304, and the electrical control signals of the control system are connected to the circuit 300, particularly to the valve 303.

Furthermore, it is obvious for anyone skilled in the art that although the invention has been illustrated in the above description by means of an advantageous delimbing apparatus, the invention can also be applied in other delimbing apparatuses within the scope of the claims. For example, it is obvious that with the frame structure 2 of the apparatus 1 varying, it may be advantageous to fasten the means to the second or both ends of the joint arm 103, wherein the joint frame 101 is fastened to the frame 2 in a fixed manner. In this case, the block 400 does not swivel with the joint 100 either. Also, in this case, pressurized medium can be easily led to the joint 100 via channels integrated in the frame 2, and the circuit 300 can be alternatively integrated in the frame 2. At the same time, the block can be placed in a more protected manner.

What is claimed is:

1. A delimbing apparatus for processing elongated pieces, particularly tree trunks, which apparatus comprises a frame structure to be suspended at the end of a boom assembly in a working machine, at least one member which is pivotable in relation to said frame structure, actuators for controlling the position of said member, characterized in that said actuators comprise at least one joint driven by a pressurized medium for coupling said member to the apparatus, the joint comprising a joint frame, a joint arm swivelled in said joint frame, and a blade structure fined therebetween, by means of which blade structure the pressure effect of the pressurized medium is arranged to swivel the joint frame and the joint arm in relation to each other to control the position of said member.

2. An apparatus according to claim 1, wherein the joint comprises an integrated control circuit for controlling the volume flow and pressure of the pressurized medium to be supplied to the joint.

3. An apparatus according to claim 1, wherein
the joint comprises a space for pressurized medium between the joint frame and the joint arm, which space is divided, by means of a first blade structure fastened to the joint arm and a second blade structure fastened to the joint frame, in a sealed manner into at least two separate pressurized medium compartments, and a channeling for conveying pressurized medium into and from each compartment.

4. An apparatus according to claim 1, wherein said member comprises a feeding member for feeding the trunk through the apparatus for delimbing, the feeding member being connected to the frame structure in an articulated manner by means of said joint driven by a pressurized medium.

5. An apparatus according to claim 1, wherein said member comprises a delimbing member for delimbing the trunk to be fed through the apparatus, which delimbing member is connected to the frame structure in an articulated manner by means of said joint driven by a pressurized medium.

6. An apparatus according to claim 1, wherein said member comprises grapple member for gripping the trunk, which grapple member is connected to the frame structure in an articulated manner by means of said joint driven by a pressurized medium.

7. An apparatus according to claim 1, wherein said member comprises a tilt arm for changing the position of the apparatus, which tilt arm is connected to the frame structure in an articulated manner by means of said joint driven by a pressurized medium.

8. An apparatus according to claim 1, wherein two said members swivelling in opposite directions are arranged as a pair, wherein the first member of the pair is provided with a joint driven by a pressurized medium, and wherein a link transmitting movement and power is arranged between said members for producing the swivelling of the second member.

9. An apparatus according to claim 3, wherein the control circuit is fitted in a valve block to be coupled to the joint frame, the valve block being coupled directly to the channellings.

10. An apparatus according to claim 1, wherein it comprises at least
a feeding member which is articulated in relation to the frame structure for feeding the trunk through the apparatus,
first actuators for controlling the position of the feeding member and the force compressing the trunk,
a delimbing member, articulated in relation to the frame structure, for holding and delimbing the trunk to be fed through the apparatus, and
second actuators for controlling the position of the delimbing member and the force supporting the trunk,
a tilt arm, articulated in relation to the frame structure, for supporting the apparatus,
fourth actuators for controlling the relative position of the tilt arm and the apparatus, and
a cutting member for cutting the trunk.

* * * * *

UNITED STATES PATENT AND TRADEMARK OFFICE
CERTIFICATE OF CORRECTION

PATENT NO.        : 6,622,761 B1                                              Page 1 of 1
APPLICATION NO.   : 09/890753
DATED             : September 23, 2003
INVENTOR(S)       : Paakkunainen et al.

It is certified that error appears in the above-identified patent and that said Letters Patent is hereby corrected as shown below:

Title Page, column 6, line 63, "fined" should be --fitted--.

Title Page, Item (57), ABSTRACT, line 2, "particular" should be --particularly--.

Signed and Sealed this

Fifteenth Day of August, 2006

JON W. DUDAS
*Director of the United States Patent and Trademark Office*